Oct. 30, 1951          R. H. DOORNBOS          2,572,992
AUTOMATIC FOCUS REDUCER AND COPYING CAMERA
Filed Sept. 7, 1948          2 SHEETS—SHEET 1
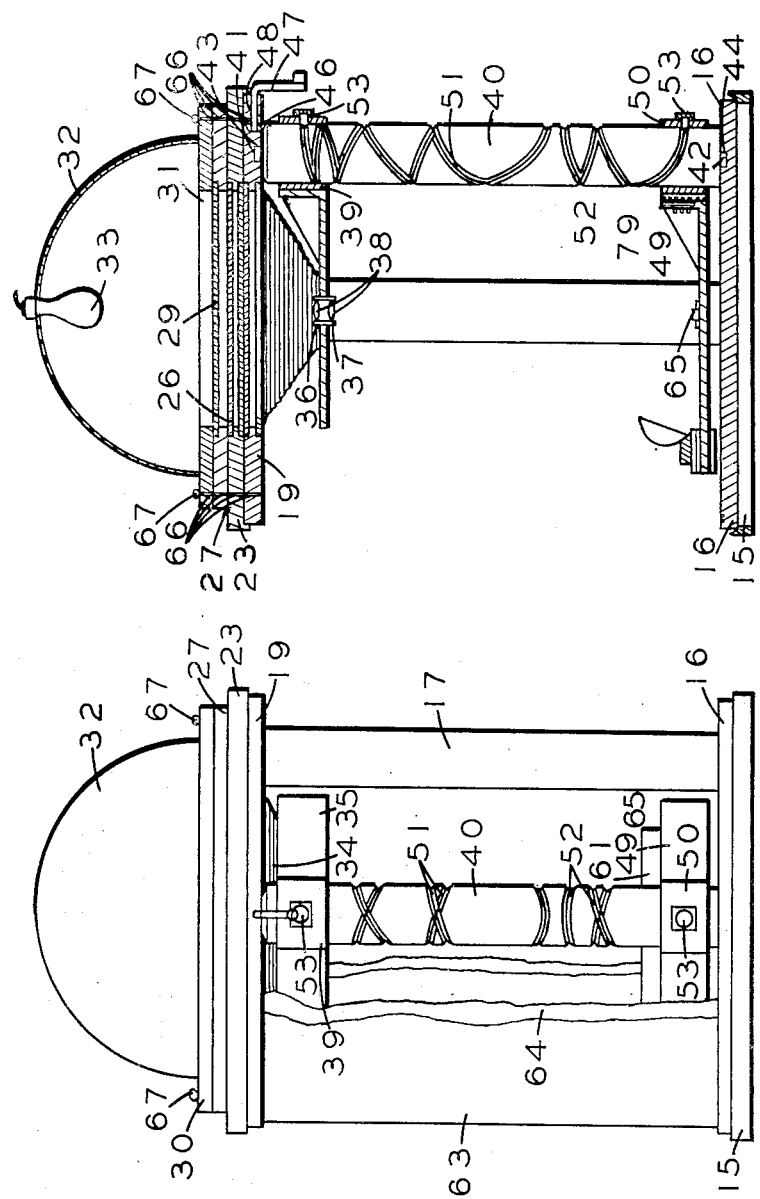
INVENTOR.
RALPH H. DOORNBOS
BY M. Y. Charles
ATTORNEY.

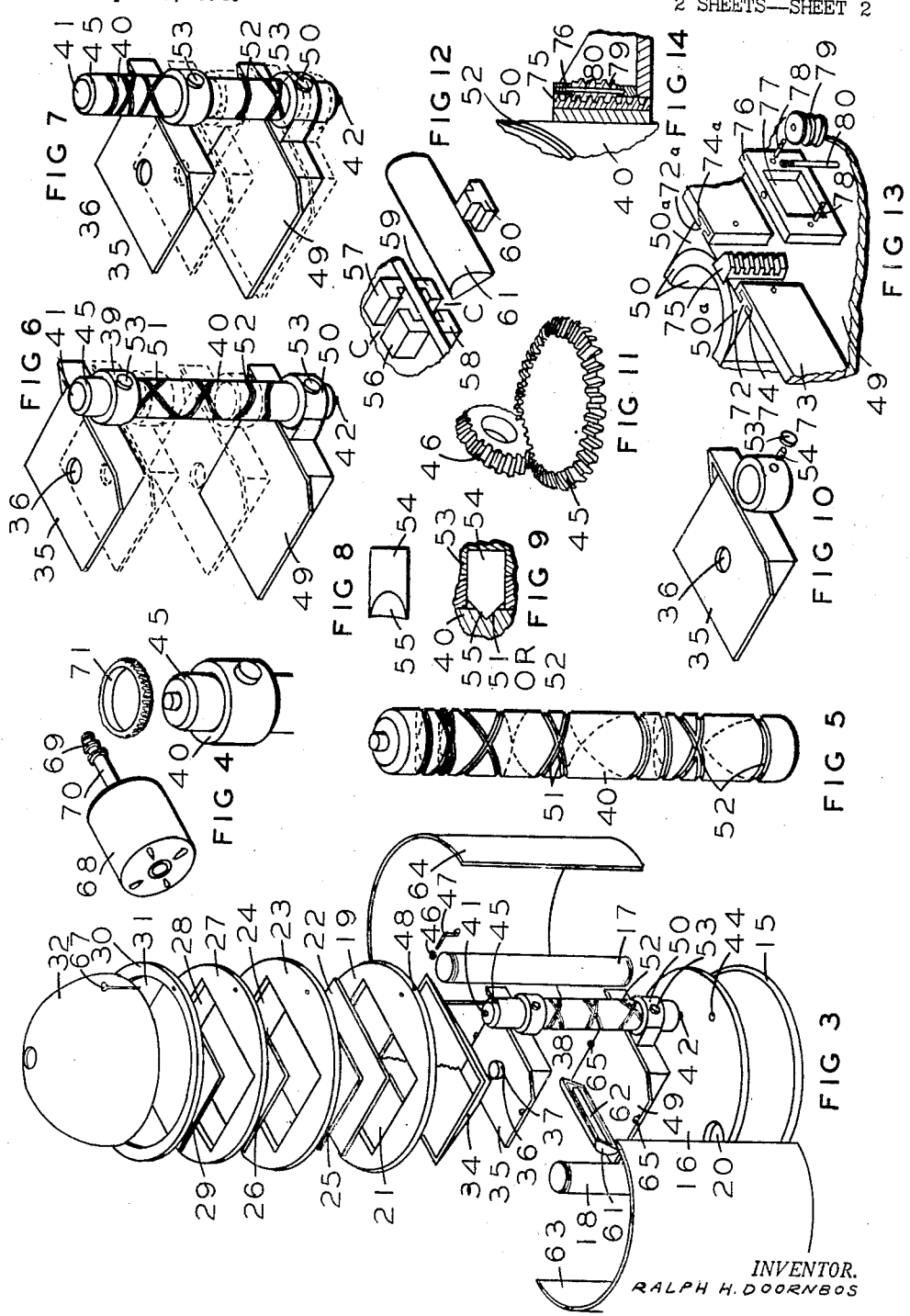

Patented Oct. 30, 1951

2,572,992

UNITED STATES PATENT OFFICE 2,572,992

AUTOMATIC FOCUS REDUCER AND COPYING CAMERA

Ralph H. Doornbos, Wichita, Kans., assignor of one-sixth to Carl L. Doornbos and one-ninth to Perry A. Carlson, both of Wichita, Kans; one-ninth to Silas M. Elder, Boonerdale, Ark., one-eighteenth to Floyd H. Doornbos and one-eighteenth to John Doornbos, both of El Dorado, Kans.

Application September 7, 1948, Serial No. 47,974

1 Claim. (Cl. 88—24)

My invention relates to an improvement in automatic focus projector devices. An object of my invention is to provide a device of the kind mentioned that has an image plate, a focusing lens and a copy holder and means for the simultaneous movement of the lens and copy holder for projecting an image in focus of a selected size on the image plate.

Another object of my invention is to provide a device of the kind mentioned in which the movement of the copy plate and lens may be accomplished by hand or by power driven means.

A further object of my invention is to provide a device of the kind mentioned which may be used for photographic enlargements or reductions or may be used for image production of selected size for tracing purposes and visual inspection purposes.

A still further object of my invention is to provide a device of the kind mentioned in which the portion of the device intermediate the plane of the image plate and the bottom of the device is housed in a light tight enclosure that may be opened and closed to facilitate the convenient work and using of the device.

A still further object of the invention is to provide a device of the kind mentioned that is light in weight, simple in construction, one that is accurate in its work, one that is sturdy and durable in construction and therefore long lived as well as being comparatively cheap to construct.

A still further object of the invention is to provide a device of the kind mentioned in which the positions of the image plate and the copy plate may be exchanged for reverse action or use of the machine.

Now referring to the accompanying drawings in which similar numerals in reference designate the same parts throughout the several figures of the drawings;

Fig. 1 is a side view of the machine, parts of which are broken away for convenience of illustration.

Fig. 2 is a rear view of the machine and the housing portions thereof being removed for convenience of illustration.

Fig. 3 is an exploded view of the several parts of the machine and showing the parts in their relative positions as they would be assembled in the machine.

Fig. 4 is an exploded view of the several parts of the power driven form of the machine.

Fig. 5 is a side view of the threaded focus controlled shaft.

Fig. 6 is a perspective view of the threaded focus controlled shaft and having the copy plate and the lens board and adjustable sleeves therefor, in place on the focus control shaft.

Fig. 7 is a perspective view of the focus control shaft and showing the copy plate and lens board and sleeves therefor and in a differently adjusted position on the shaft from that shown in Fig. 6.

Fig. 8 is a side view of the thread following pin.

Fig. 9 is a view of the thread following pin assembled as it is in both the copy plate sleeve and the lens board sleeve.

Fig. 10 is a perspective view of the lens board and the supporting sleeve therefor, and showing the thread follower in position for assembly on the sleeve.

Fig. 11 is a perspective view of a drive pinion and ring gear employed in the hand operation of rotating the focus control shaft.

Fig. 12 is a perspective view showing a light reflector holder and means for retaining the holder on the copy plate.

Fig. 13 is an exploded perspective view of the copy platform adjusting device.

Fig. 14 is a cross sectional view showing the assembled parts that are shown in Fig. 15.

In the drawings the machine is shown as having, preferably a circular shaped base ring element 15 in which is mounted the base plate.

The device is provided with a pair of cylindrical support elements 17 and 18, the ends of which are threaded, one with a right hand thread and the other with a left hand thread for purposes that will later be described.

The machine also is provided with an upper support plate. The upper support plate 19 and the base plate 16 are provided with holes such as 20 that are threaded to receive the right and left hand threads of the support elements 17 and 18, whereby the upper plate 19 is rigidly supported by the base plate 16. In a fixed spaced position thereabove the support plate 19 has a centrally positioned large opening 21 therein in which is seated a piece of preferably polished glass 22.

The machine is provided with a spacer plate 23 that has a large centrally positioned opening 24 in which is positioned two pieces of glass 25 and 26 that are spaced apart and the lower glass 25 is preferably a piece of polished plate glass while the upper piece 26 is a piece of what is known as opal glass.

The device is provided with a second spacer plate 27 in which is centrally positioned a large opening 28 in which is positioned a second piece of opal glass 29.

The machine is also provided with a reflector support plate 30 in which is centrally positioned a large opening 31 over which is positioned a reflector shell 32 in which is supported a standard electric light 33 that is used in processes carried on in this machine.

The upper end of a bellows 34 is connected to the under side of the first said support plate 19 and the lower end of the bellows 34 is connected to the upper side of a lens board 35 and surrounds an opening 36 therein in which is carried a sleeve 37 that serves as a mounting or holder for one or more lenses 38. The lens board 35 is carried by sleeve element 39 that is slidable vertically up and down a focus control shaft 40, the ends of which have journal pins 41 and 42 thereon that are revolvably carried in bearings 43 and 44 formed, one in the base plate 16 and the other in the upper support plate 19.

The machine is provided with a copy plate 49 that is adjustably carried on a slip sleeve 50 that is slidable vertically up and down the focus control shaft 40.

The sleeve 50 is provided with back portion 50a that is an integral part of the sleeve 50 and presents a smooth vertical face having vertically positioned and outwardly extending dove-tailed tongues 72 and 72a. The copyboard 49 is provided with an upwardly extending back portion 73, the base side of which is provided with dove-tailed grooves 74 and 74a in which the dove-tailed tongues 72 and 72a are slidably seated. The front central portion of the sleeve 50 is provided with a vertically positioned thread rack 75. The front of the plate 73 is provided with a rectangular shaped frame 76 that has a rectangular opening 77 that is rigidly attached to the back 73 by means of screws 78 that pass therethrough and are threaded into the back 73. A threaded thumb nut 79 is positioned in the frame opening 78 and is revolvably carried on a pin 80 that passes through the frame 76 and the thumb nut 79 whereby the threads of the thumb nut 79 are in engagement with the teeth of the thread rack 75.

The focus control shaft 40 has two reversing threads 51 and 52 therein, that is, each thread travels around the shaft to a fixed point whereupon the thread reverses and travels in a reversed direction to the original point of beginning. The object of reversing the threads 51 and 52, as above described, is to permit the shaft 40 to be continuously turned in one direction and as the copy plate 49 and the lens board 35 each reach their extreme upper or lower positions they will automatically reverse their direction of travel, therefore there will be no locking or reversing of the shaft 40 as it continues to turn.

Each of the sleeve support elements 39 and 50 is provided with a swivel socket as 53 in which is revolvably carried a pin as 54, one end of which is V-shaped as at 55 and rests, one in each of the threads 51 and 52.

The copy board 49 is provided with two pairs of rabbetted blocks 56 and 57, 58 and 59 that are positioned, one pair on each side of the copy board 49, said blocks being spaced apart so as to leave T-shaped channels C therebetween. The reflector holder element comprises a T-shaped block 60 that is adapted to be slidably received in either of the T-shaped channels C and a reflector 61 is rigidly carried on the end of the leg of the T-shaped block 60, said reflector 61 has a light tube 62 carried therein from which light may be projected and reflected by the reflector onto the copy plate 49.

The threads 51 and 52 in the focus control shaft are so pitched and are so related to each other that as the focus control shaft 40 is revolved by turning the crank 47, the copy plate 49 and the lens board 35 will be moved towards or away from each other in positions relative to the image plate 22 so that during all of the movement they will cooperate to project a clear cut image from the copy placed on the copy plate onto the image plate 22 and during these movements the image projected on the image plate 22 will be increased or decreased in size and when the proper size is achieved the turning of the focus control shaft may be ceased. The image thus having been produced, tracing paper may be placed over the image plate and the tracings of the image may be made by hand or light sensitive plates or films may be substituted for the tracing paper and enlargements or reductions of the copy be so obtained.

If desired, the machine may be used in reverse order in which a picture-carrying plate or film would be placed over the transparent glass 22, whereupon the rays of light from the light bulb 33 would be gathered by the lens 38 and projected onto a light sensitive paper or the like, carried on 49, for printing purposes.

The machine is provided with a pair of substantially made half circle housing elements 63 and 64. These housing elements 63 and 64 are carried in channel formations around the base plate 16 and the upper support plate 19 and may be slid therearound to open and close the elements of the machine contained between the said plates 16 and 19.

The copy plate 49 and the lens board 35 are positioned between the two support elements 17 and 18 and rollers, such as 65 are carried the two plates 49 and 35 and bear against the support elements 17 and 18 so as to prevent the plates 49 and 35 from swinging sideways as the focus control shaft 40 revolves to change the relative positions of the two plates 49 and 35.

The plates 23, 27 and 30 are used in various combinations and placed, one on the other and the plates have registering holes 66 therein through which pins 67 are passed to properly station the said plates one upon the other.

In Fig. 4 is shown an electric motor 68 having a worm 69 on the drive shaft 70 thereof that is adapted to be in mesh with a ring gear 71 that may be fixed on the upper end of the focus control shaft 40 whereby the shaft 40 may be revolved by power instead of a crank as illustrated in Figures 3 and 2.

It may be that copies will sometimes be made from books or other articles that may have considerable thickness and when placed on the copyboard 49 the thickness would throw the machine out of focus. Now by turning the threaded thumb nut 79 the copyboard 49 may be raised or lowered until the projected image is in focus, whereupon the machine may be adjusted for enlargements or reductions the same as previously described.

While the machine as shown in the drawings and described in the foregoing specifications is probably the preferred form of the invention it is to be understood that such modifications of the invention may be employed as lie within the scope of the appended claim without departing from the spirit and intention of the invention.

Now having fully shown and described my invention, what I claim is:

In an automatic focus enlarger and copying camera device of the kind described; said device having a copy holder plate, a lens holder plate having a lens assembly therein, and a support for an image receiving element, a focus adjusting element, said focus adjusting element being a rotatable shaft having two sets of oppositely pitched and connected threads to form two continuous thread portions, one of said threaded portions having a sleeve therearound and being in threaded engagement with its respective threaded portion and carrying the said copy holder plate, the second of said threaded portions having a second sleeve therearound and in threaded engagement with the second said threaded section and carrying the said lens holder plate and means for revolving the said shaft to simultaneously move both the copy holder plate and the lens holder plate in predetermined positions to clearly form an image on an image receiving element above the said lens assembly in variable size during the continuous turning of said shaft, and means carried by the said copy plate holder sleeve for raising and lowering the copy holder plate up and down relative to its supporting sleeve.

RALPH H. DOORNBOS.

REFERENCES CITED

The following references are of record in the file of this patent:

UNITED STATES PATENTS

| Number | Name | Date |
|---|---|---|
| 730,583 | Stender | June 9, 1903 |
| 1,406,041 | Lehto | Feb. 7, 1922 |
| 1,645,367 | August | Oct. 11, 1927 |
| 2,325,120 | Forse | July 27, 1943 |
| 2,364,362 | Hopkins | Dec. 5, 1944 |

FOREIGN PATENTS

| Number | Country | Date |
|---|---|---|
| 609,676 | France | May 17, 1926 |